(12) United States Patent
Lee et al.

(10) Patent No.: US 11,441,202 B2
(45) Date of Patent: Sep. 13, 2022

(54) WIRE ROD FOR COLD HEADING, PROCESSED PRODUCT USING SAME, AND MANUFACTURING METHOD THEREFOR

(71) Applicant: POSCO, Pohang-si (KR)

(72) Inventors: Jae Seung Lee, Pohang-si (KR); Han Hwi Kim, Pohang-si (KR); In-Gyu Park, Pohang-si (KR); Byoung Gab Lee, Pohang-si (KR); Sang-Yoon Lee, Pohang-si (KR)

(73) Assignee: POSCO, Pohang-si (KR)

( * ) Notice: Subject to any disclaimer, the term of this patent is extended or adjusted under 35 U.S.C. 154(b) by 10 days.

(21) Appl. No.: 16/772,391

(22) PCT Filed: Oct. 10, 2018

(86) PCT No.: PCT/KR2018/011911
§ 371 (c)(1),
(2) Date: Jun. 12, 2020

(87) PCT Pub. No.: WO2019/132195
PCT Pub. Date: Jul. 4, 2019

(65) Prior Publication Data
US 2021/0079491 A1      Mar. 18, 2021

(30) Foreign Application Priority Data
Dec. 26, 2017 (KR) .................... 10-2017-0179227

(51) Int. Cl.
*C21D 9/00* (2006.01)
*C21D 6/00* (2006.01)
(Continued)

(52) U.S. Cl.
CPC ............ *C21D 9/0093* (2013.01); *C21D 6/002* (2013.01); *C21D 6/005* (2013.01); *C21D 6/008* (2013.01);
(Continued)

(58) Field of Classification Search
CPC ........ C21D 6/002; C21D 6/005; C21D 6/008; C21D 8/06; C21D 8/065; C21D 9/0093;
(Continued)

(56) References Cited

FOREIGN PATENT DOCUMENTS

| CN | 102549174 A | 7/2012 |
|---|---|---|
| CN | 103842546 A | 6/2014 |

(Continued)

OTHER PUBLICATIONS

Chinese Office Action dated Jun. 11, 2021 issued Chinese Patent Application No. 201880083505.5 (with English translation).
(Continued)

*Primary Examiner* — Jenny R Wu
(74) *Attorney, Agent, or Firm* — Morgan, Lewis & Bockius LLP

(57) ABSTRACT

The present disclosure provides a wire rod for cold heading that can shorten the spheroidizing heat treatment time, processed products using the same, and manufacturing method thereof. A wire rod for cold heading according to an embodiment of present disclosure includes, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%, and the remainder of iron (Fe) and other inevitable impurities, and the microstructure has a long and short axis ratio of cementite present in pearlite colonies of 200:1 or less.

8 Claims, 8 Drawing Sheets

(51) Int. Cl.
    *C21D 8/06*     (2006.01)
    *C22C 38/00*     (2006.01)
    *C22C 38/02*     (2006.01)
    *C22C 38/04*     (2006.01)
    *C22C 38/06*     (2006.01)
    *C22C 38/22*     (2006.01)
    *C22C 38/24*     (2006.01)
    *C22C 38/26*     (2006.01)
    *C22C 38/28*     (2006.01)
    *F16B 33/00*     (2006.01)

(52) U.S. Cl.
    CPC ............ *C21D 8/065* (2013.01); *C22C 38/001* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *F16B 33/00* (2013.01); *C21D 2211/003* (2013.01); *C21D 2211/005* (2013.01); *C21D 2211/009* (2013.01)

(58) Field of Classification Search
    CPC ...... C21D 38/00; C21D 38/001; C21D 38/02; C21D 38/04; C21D 38/06; C21D 38/18; C21D 38/22; C21D 38/24; C21D 38/26; C21D 38/28; F16B 33/00; Y02P 10/20
    See application file for complete search history.

(56) References Cited

FOREIGN PATENT DOCUMENTS

| | | | |
|---|---|---|---|
| EP | 2017358 | A2 | 1/2009 |
| EP | 2765213 | A1 | 8/2014 |
| EP | 3181713 | A1 | 6/2017 |
| JP | 2001-192731 | A | 7/2001 |
| JP | 2001-234286 | A | 8/2001 |
| JP | 3851533 | B2 | 11/2006 |
| JP | 2013-007091 | A | 1/2013 |
| JP | 5204328 | B2 | 6/2013 |
| JP | 2013-234349 | A | 11/2013 |
| JP | 2015-168882 | A | 9/2015 |
| JP | 2016-191099 | A | 11/2016 |
| JP | 2017-048459 | A | 3/2017 |
| KR | 10-1262462 | B1 | 5/2013 |
| KR | 10-1461763 | B1 | 11/2014 |
| KR | 10-1518571 | B1 | 5/2015 |
| KR | 10-2017-0072995 | A | 6/2017 |
| WO | 2015/049742 | A1 | 4/2015 |
| WO | 2015/189978 | A1 | 12/2015 |
| WO | WO-2015189978 | A1 * | 12/2015 ............ C22C 38/02 |
| WO | 2017/038436 | A1 | 3/2017 |
| WO | 2017/115842 | A1 | 7/2017 |

OTHER PUBLICATIONS

Japanese Office Action dated Jul. 6, 2021 issued in Japanese Patent Application No. 2020-536090.
Written Opinion and International Search Report dated Jan. 28, 2019 issued in International Patent Application No. PCT/KR2018/011911 (English translation).
Extended European Search Report dated Aug. 10, 2020 issued in European Patent Application No. 18896289.8.
Notice of Allowance dated Nov. 11, 2019 issued in Korean Patent Application No. 10-2017-0179227 (English translation).
Japanese Office Action dated Mar. 15, 2022 issued in Japanese Patent Application No. 2020-536090 (with English translation).
Chinese Office Action dated May 27, 2022 issued in Chinese Patent Application No. 201880083505.5 (with English translation).

* cited by examiner

[FIGURE 1a]
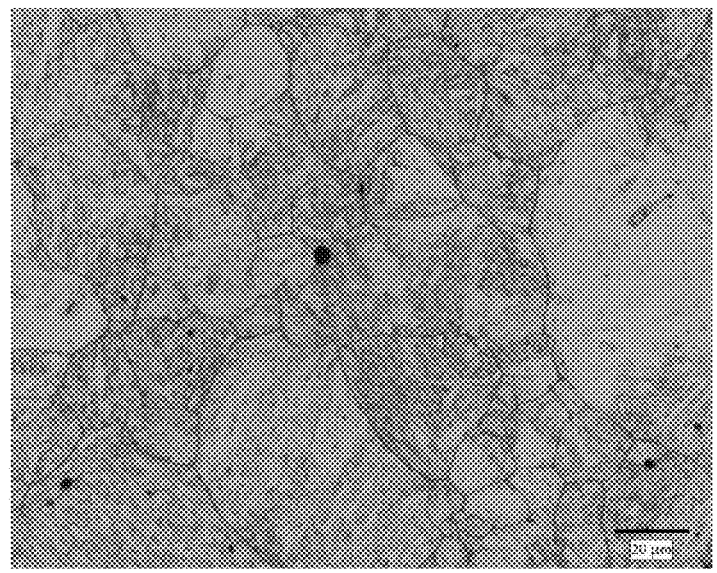

[FIGURE 1b]
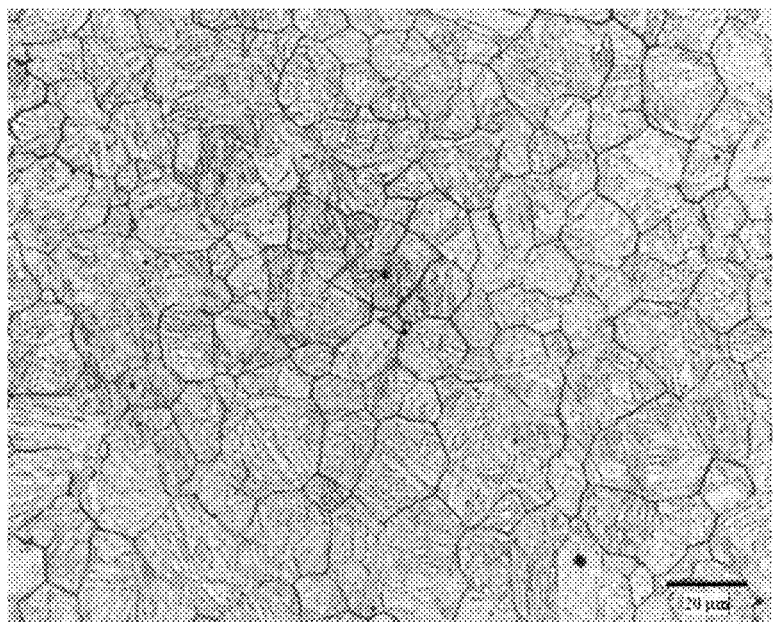

[FIGURE 2a]
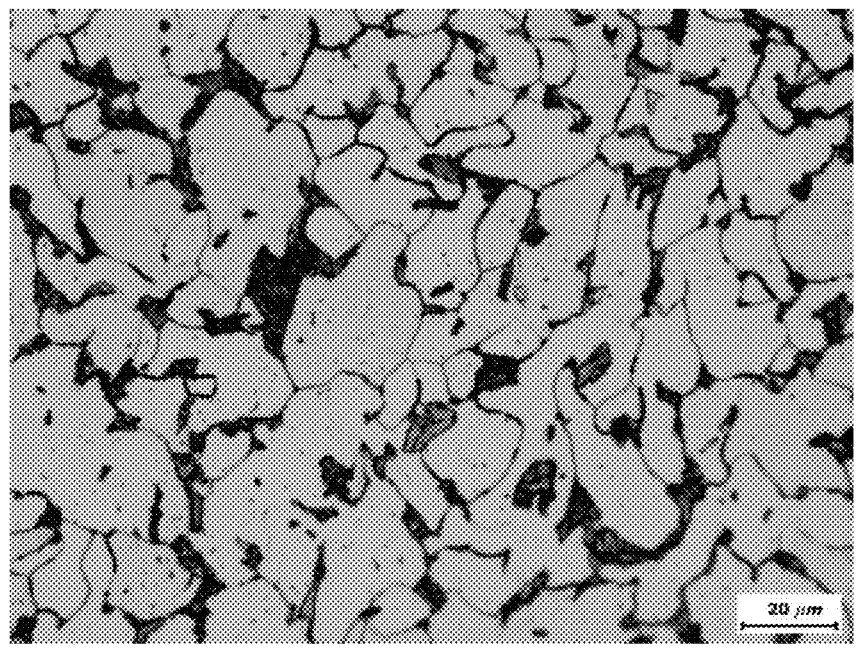

[FIGURE 2b]
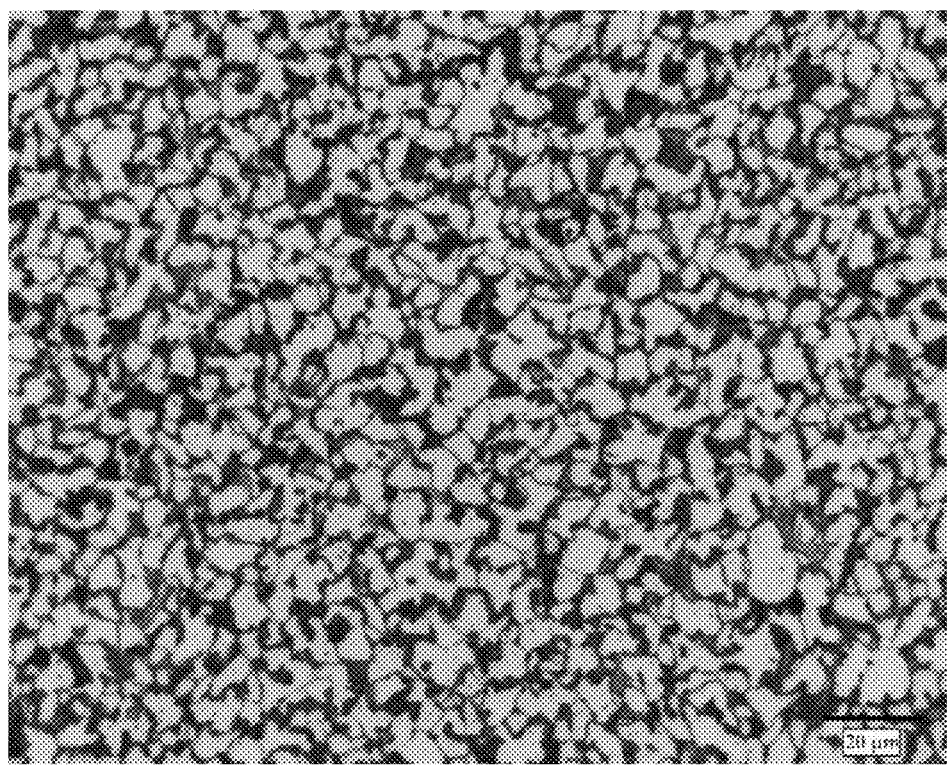

[FIGURE 3a]
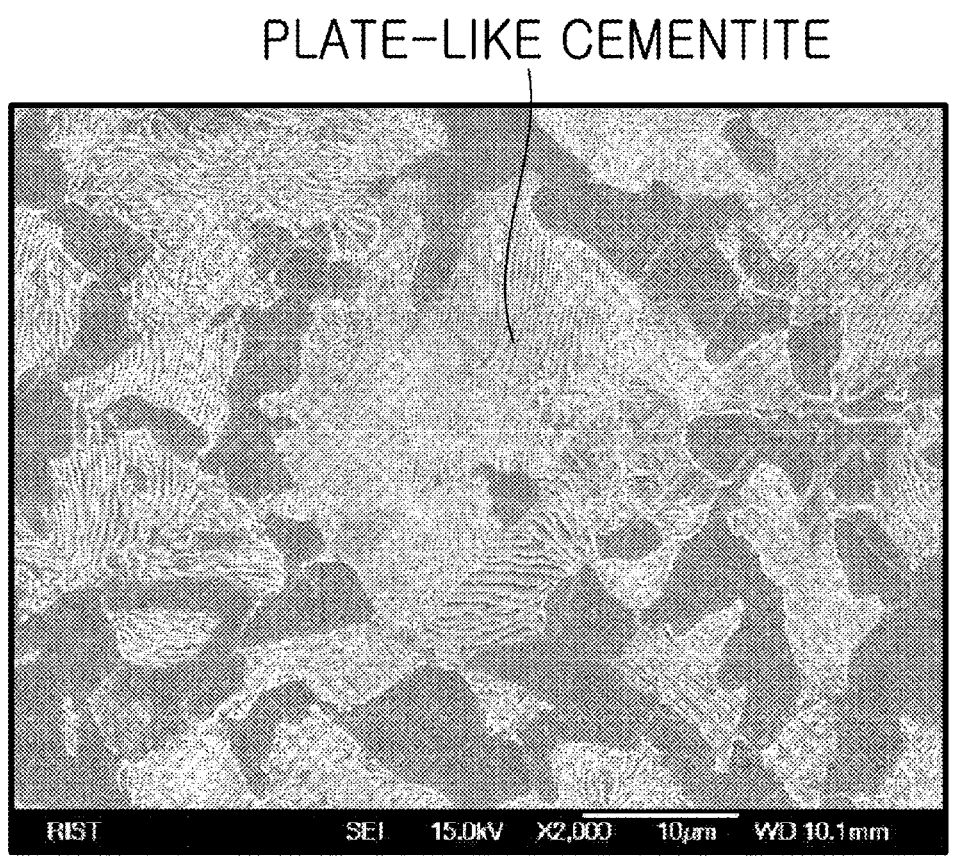

[FIGURE 3b]
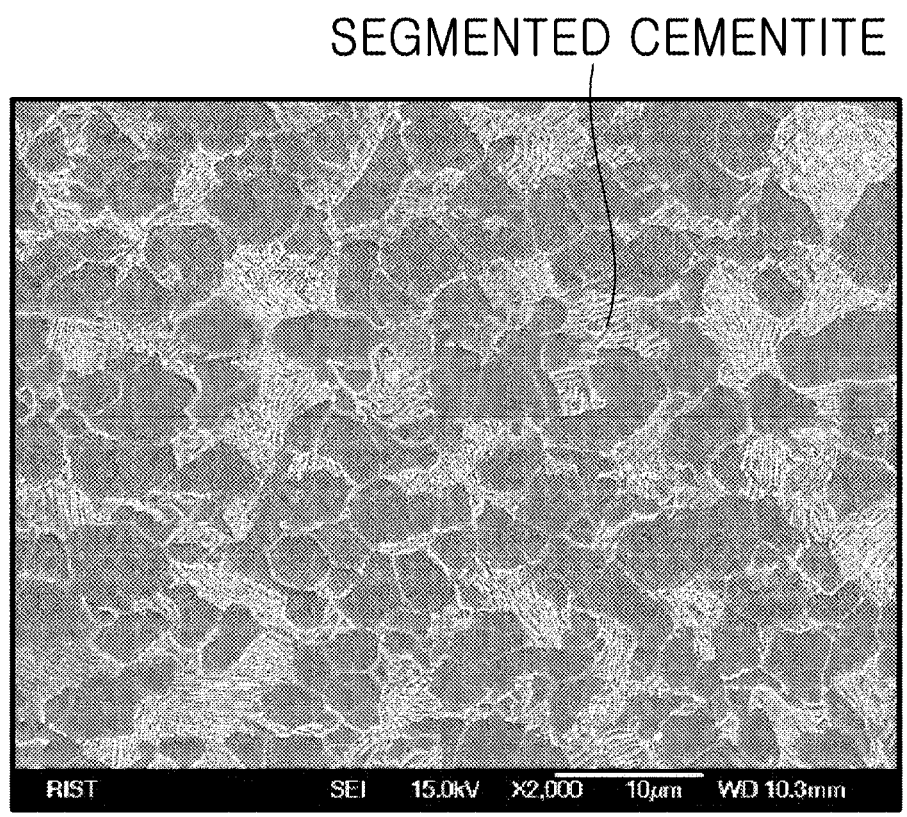

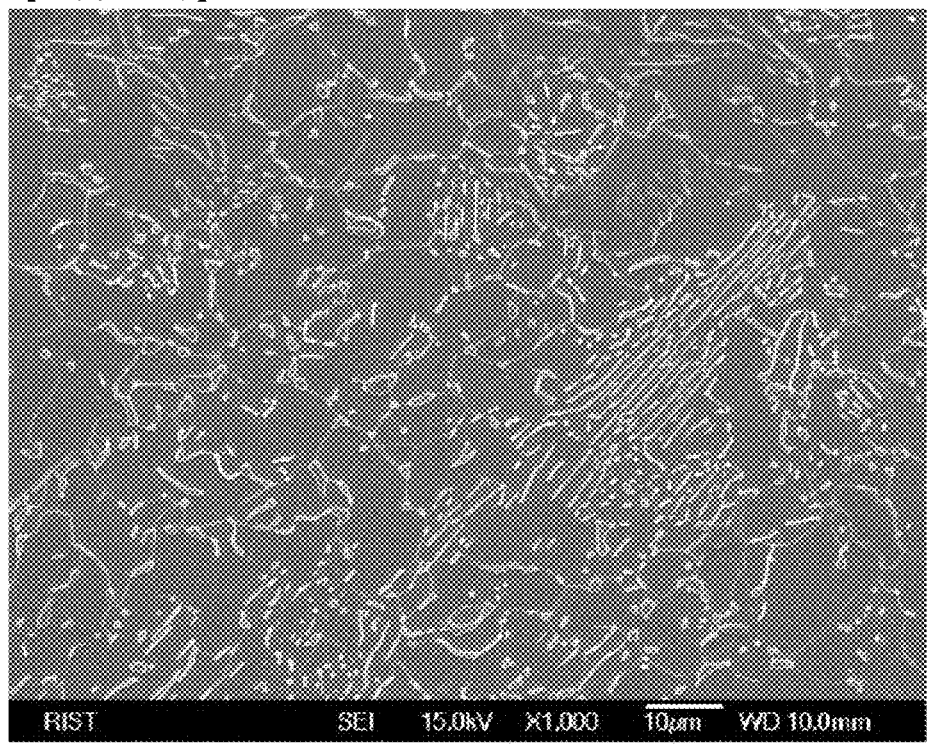
[FIGURE 4a]

[FIGURE 4b]
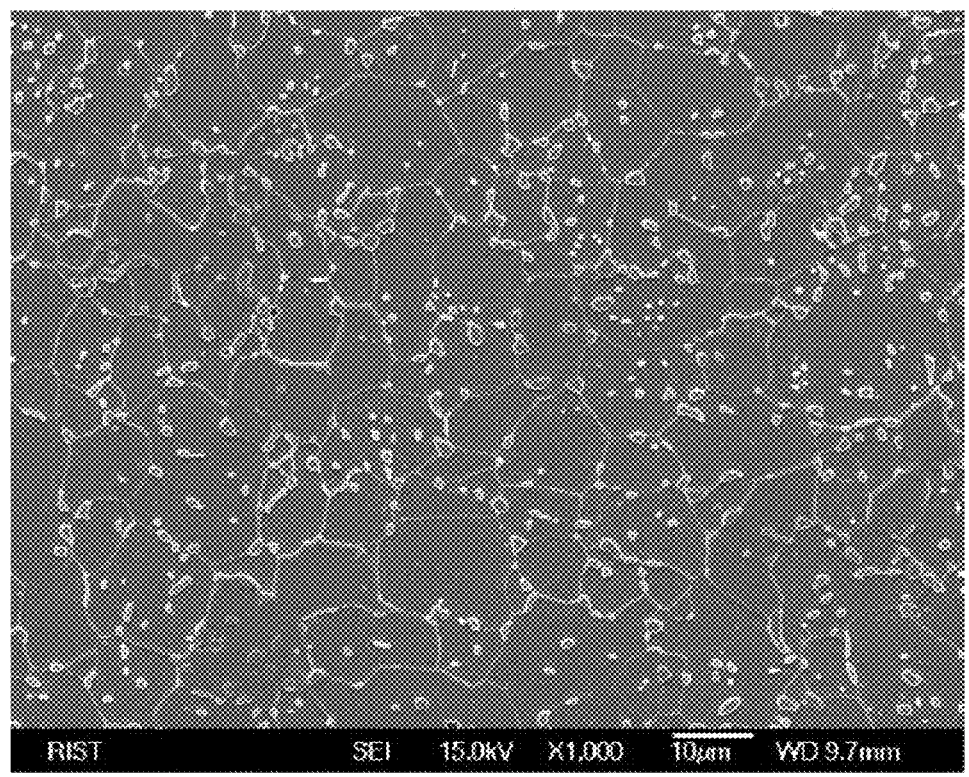

WIRE ROD FOR COLD HEADING, PROCESSED PRODUCT USING SAME, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2018/011911, filed on Oct. 10, 2018, which in turn claims the benefit of Korean Application No. 10-2017-0179227, filed on Dec. 26, 2017, the entire disclosures of which applications are incorporated by reference herein.

TECHNICAL FIELD

The present disclosure relates to a wire rod for cold heading, more specifically, provides a wire rod for cold heading, which can be used for bolts for cold heading and can shorten spheroidizing heat treatment, a processed product using the same, and a manufacturing method thereof.

BACKGROUND ART

Most structural steels are quenched and tempered steels that are reheated, quenched and tempered after hot processing to increase strength and toughness.

On the other hand, non-normalized steel is a steel to replace quenched and tempered steel, and means steel that can obtain mechanical properties such as strength similar to that of heat-treated steel without additional heat treatment after hot working.

Typical wire rod products are manufactured as final products by performing hot rolled wire rod, cold drawing, spheroidizing heat treatment, cold drawing, cold heading, quenching and tempering.

On the other hand, the non-normalized wire rod is manufactured as a final product through a hot rolled wire rod, cold drawing, cold heading process. In this way, by omitting two heat treatments (spheroidizing heat treatment and Q & T heat treatment) required in the existing product processing process, it is possible to obtain a product with excellent economic efficiency by lowering the manufacturing cost of the material.

Non-normalized steel is an economical product that omits the heat treatment process, and since it does not proceed with final quenching and tempering, it has the effect of securing defects due to heat treatment, that is, straightness due to bending of heat treatment, and is applied to many products.

However, in the case of non-normalized steel, since the continuous cold processing is performed in a state in which the heat treatment process is omitted, the strength of the product increases as the process progresses, while the ductility continues to decrease.

In addition, in the manufacture of bolts, spheroidizing heat treatment must be performed after the wire rod is drawn in order to increase the rolling life, and this spheroidizing heat treatment causes a long process time to increase manufacturing cost.

Therefore, it is necessary to develop a wire rod capable of cold heading that can shorten the spheroidizing heat treatment time.

DISCLOSURE

Technical Problem

The present disclosure provides a wire rod for cold heading that can shorten the spheroidizing heat treatment time, processed products using the same, and manufacturing method thereof.

Technical Solution

In accordance with an aspect of the present disclosure, a wire rod for cold heading includes, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%, and the remainder of iron (Fe) and other inevitable impurities, and the wire rod includes a pearlite colony as microstructure, and the long and short axis ratio of cementite present in the pearlite colony is 200:1 or less.

An area fraction of the segmented cementite in the pearlite may be 5 to 50%.

The maximum size of the pearlite colony may be 5 µm or less.

The wire rod may include a ferrite as a microstructure, and the maximum size of the ferrite grain size may be 5 µm or less.

The wire rod may include at least one precipitate of Al-based carbonitride, Nb-based carbonitride, V-based carbonitride, Mo-based carbonitride, and Ti-based carbonitride.

In accordance with another aspect of the present disclosure, a processed product includes a structure including, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%, and the remainder of iron (Fe) and other inevitable impurities, and the processed product comprises a cementite with long and short axis ratio of 5:1 or less as microstructure, and an area fraction of the cementite may be 80% or more to total area.

In accordance with another aspect of the present disclosure, a manufacturing method of a wire rod for cold heading includes: heating a steel piece comprising, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%, and the remainder of iron (Fe) and other inevitable impurities; hot rolling the heated steel piece by finish rolling the heated steel piece at 700 to 780° C.; cooling to 600° C. at 5 to 20° C./s after the hot rolling, and cooling to 400° C. at 5° C./s or less.

In the hot rolling, the austenite grain size immediately before the finish rolling may be 10 µm or less.

In the hot rolling, the amount of deformation during finish rolling may be 0.4 or more.

The heating the steel piece may proceed by maintaining within 90 minute at 900 to 1050° C.

In accordance with another aspect of the present disclosure, a manufacturing method of a processed product using wire rod includes, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%, and the remainder of iron (Fe) and other inevitable impurities, and includes a microstructure having a long and short axis ratio of 200:1 or less of cementite in a pearlite colony, the manufacturing method includes: heating at 650 to 780° C. for 6 to 10 hours at a heating rate of 50 to 100° C./hr; and performing a softening heat treatment at a cooling rate of 10 to 20° C./hr.

The area fraction of cementite with long and short axis ratio of 5:1 or less to total area may be 80% or more.

A content of carbonitride inside may be 80% or more of the total.

Advantageous Effects

The wire rod for cold heading according to an embodiment of the present invention and processed products using the same can shorten the spheroidizing heat treatment time, thereby reducing costs.

DESCRIPTION OF DRAWINGS

FIG. 1 (a) is a photograph showing the microstructure of Comparative Example 1 before the start of finish rolling, FIG. 1 (b) is a photograph showing the microstructure of Inventive Example 2, which is an embodiment of the present disclosure before the start of finish rolling.

FIG. 2 (a) is a photograph showing the microstructure of Comparative Example 1 in the early stage of cooling immediately after finishing rolling, and FIG. 2 (b) is a photograph showing the microstructure of Inventive Example 2, which is an embodiment of the present disclosure in the initial stage of cooling immediately after finishing rolling.

FIG. 3 (a) is a photograph showing the microstructure of the wire rod of Comparative Example 3 obtained through slow cooling, FIG. 3 (b) is a microstructure of the Inventive Example 4 wire rod that is an embodiment of the present disclosure obtained through slow cooling.

FIG. 4 (a) is a photograph showing the microstructure of Comparative Example 3 after spheroidizing heat treatment, and FIG. 4 (b) is a photograph showing the microstructure of Inventive Example 4, which is an embodiment of present disclosure after spheroidizing heat treatment.

BEST MODE

In accordance with an aspect of the present disclosure, a wire rod for cold heading includes, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%, and the remainder of iron (Fe) and other inevitable impurities, and the wire rod includes a pearlite colony as microstructure, and the long and short axis ratio of cementite present in the pearlite colony is 200:1 or less.

MODES OF THE INVENTION

Hereinafter, embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

A wire rod for cold heading according to an embodiment of present disclosure includes, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%.

The roles and contents of each component included in the wire rod for cold heading according to the present disclosure are as follows. The percentages for the following components refer to weight percent.

The content of C (carbon) is 0.15 to 0.5%.

When the content of C is 0.5% or more, almost all structures are composed of pearlite, making it difficult to secure ferrite grains. Conversely, when C is less than 0.15%, it is difficult to secure sufficient strength after the final quenching and tempering heat treatment due to the decrease in the base material strength. Accordingly, according to an embodiment of the present disclosure, the content of C is 0.15 to 0.5%.

The content of Si (silicon) is 0.1 to 0.4%.

Si is an important element in securing the strength of steel. When Si is less than 0.1%, it is difficult to secure the strength and sufficient hardenability of the steel. Conversely, when Si exceeds 0.4%, cold workability deteriorates during cold forging after softening heat treatment. Accordingly, according to an embodiment of the present disclosure, the Si content is 0.1 to 0.4%.

The content of Mn (manganese) is 0.3 to 1.5%.

Mn forms a solid solution for substitution in the matrix and refines the pearlite interlayer spacing. When Mn is included in excess of 1.5%, cracks may occur due to structure unevenness due to Mn segregation. In addition, macro-segregation or micro-segregation may occur upon solidification of the steel, and Mn segregation has a relatively low diffusion coefficient compared to other elements, thereby promoting segregation zone and improving hardenability. This is the main cause of the formation of the core cold structure (core martensite). Conversely, when Mn is added to less than 0.3, it is difficult to secure sufficient hardenability to secure martensite structure after quenching and tempering heat treatment. Accordingly, according to an embodiment of the present disclosure, the content of Mn is 0.3 to 1.5%.

The content of Cr (chromium) is 0.1 to 1.5%.

When Cr is less than 0.1%, it is difficult to sufficiently secure hardenability for obtaining martensite during final quenching and tempering heat treatment. On the contrary, when Cr is more than 1.5%, a central segregation is generated, and there is a high possibility of low-temperature structure in the wire rod. Accordingly, according to an embodiment of the present disclosure, the content of Cr is 0.1 to 1.5%.

The content of Al (aluminum) is 0.02 to 0.05%.

Al is an important element as a deoxidizer. When Al is less than 0.02, it is difficult to secure a deoxidizing power. Conversely, when Al exceeds 0.05%, hard inclusions such as $Al_2O_3$ may increase, and accordingly, nozzle clogging due to inclusions may occur during continuous casting. Accordingly, according to an embodiment of the present disclosure, the Al content is set to 0.02 to 0.05%.

The content of N (nitrogen) is 0.004 to 0.02%.

When N is 0.004% or less, it is difficult to secure a nitride, and the amount of precipitation of Ti, Nb, V, and the like may decrease. On the contrary, when N is 0.02% or more, the toughness and ductility of the wire rod may be deteriorated due to the solid nitrogen not bound to precipitate. Accordingly, according to an embodiment of the present disclosure, the content of N is 0.004 to 0.02%.

According to an embodiment of the present disclosure, one or more selected from the group consisting of Nb: 0.001 to 0.03%, V: 0.01 to 0.3%, Mo: 0.01 to 0.5%, and Ti: 0.001 to 0.03%.

The content of Nb (niobium) is 0.001 to 0.03%.

Nb can form carbonitride such as Nb (C, N) to refine the ferrite and pearlite wire rod structures during rolling. However, if the content is less than 0.001%, precipitation is not sufficiently achieved. On the contrary, when the content of Nb exceeds 0.03%, the precipitation effect may be adversely affected by the precipitation coarsening. Accordingly, when Nb is included according to an embodiment of the present disclosure, its content is 0.001 to 0.03%.

The content of Ti (titanium) is 0.001 to 0.03%.

Ti is a powerful carbonitride-forming element that helps refine grains in the furnace. However, when Ti is less than 0.001%, the amount of precipitation is small, and the effect is reduced. Conversely, when Ti is contained in an amount exceeding 0.03%, toughness and ductility may be lowered by coarsening of precipitates. Accordingly, when Ti is included according to an embodiment of the present disclosure, the content of Ti is set to 0.001 to 0.03%.

The content of V (vanadium) is 0.01 to 0.3%.

V forms VC, VN, V (C, N), etc., and is an element that induces refinement of ferrite and pearlite wire rod structures during rolling. When the content of V is less than 0.01%, the distribution of V precipitate in the base material is small, and thus the ferrite grain boundary cannot be fixed, and accordingly, the effect on toughness is less. Conversely, when the V content exceeds 0.3%, coarse carbonitride is formed, which adversely affects toughness. Accordingly, when V is included according to an embodiment of the present disclosure, the content of V is 0.01 to 0.3%.

The content of Mo (molybdenum) is 0.01 to 0.5%.

Mo is an effective element for suppressing temper softening, which reduces the strength during tempering by forming precipitates of $Mo_2C$ during tempering during quenching and tempering heat treatment. However, when the Mo content is less than 0.01%, it is difficult to see a sufficient tempering softening effect. Conversely, when the content of Mo exceeds 0.5%, low-temperature structure is generated in a wire rod state, and an additional heat treatment cost for removing the low-temperature structure may be required. Accordingly, when Mo is included according to an embodiment of the present disclosure, the content of Mo is 0.01 to 0.5%.

A microstructure of a wire rod for cold heading according to an embodiment of the present disclosure has a long and short axis ratio of cementite present in pearlite colonies of 200:1 or less.

In addition, an area fraction of segmented cementite in the pearlite is 5 to 50%.

In addition, a maximum size of the pearlite colony is 5 μm or less.

In addition, a maximum size of the ferrite grain size is 5 μm or less.

In addition, a wire rod for cold heading according to an embodiment of the present disclosure may include at least one precipitate of Al-based carbonitride, Nb-based carbonitride, V-based carbonitride, Mo-based carbonitride, and Ti-based carbonitride, inside.

In addition, the microstructure of the processed product manufactured using a wire rod that satisfies the above-described component has a long and short axis ratio of cementite of 5:1 or less.

Hereinafter, a method of manufacturing a wire rod for cold heading according to an embodiment of the present disclosure will be described in detail.

Steel pieces satisfying the above-described component are heated. At this time, the heating temperature is 900 to 1050° C. and is maintained within 90 minutes.

Hot rolling is performed, in which the finishing rolling is performed at 700 to 780° C. on the heated steel piece. The austenite grain size just before the finish rolling in the hot rolling step may be 10 μm or less. In addition, the amount of deformation during finish rolling in the hot rolling step may be 0.4 or more.

After the hot rolling, the cooling step proceeds to cool to 600° C. at a cooling rate of 5 to 20° C./s and to 400° C. at a cooling rate of 5° C./s or less. Cooling of 5 to 20° C./s is to terminate transformation with rapid cooling to minimize cementite thickness in structures of pearlite grain size of 5 μm or less. Slow cooling below 5° C./s is intended to induce pearlite segments.

The processed product is manufactured using the wire rod manufactured in the above-described manner. The processed product is prepared by heating for 6 to 10 hours at a heating rate of 50 to 100° C./hr at 650 to 780° C., and subjecting to softening heat treatment at a cooling rate of 10 to 20° C./hr. The processed product manufactured in this way has a long and short axis ratio of 5:1 or less of cementite. In addition, carbonitride may be more than 80% of the total.

Hereinafter, the present disclosure will be described in detail through examples, but the following examples are only intended to illustrate the present disclosure in more detail, and the scope of rights of the present disclosure is not limited to these examples.

Example

Steel having the composition of the following [Table 1] and manufactured under the manufacturing conditions described was prepared. All comparative examples and inventive examples were wire rod rolled to 9 mm. The microstructure was compared under each rolling condition.

TABLE 1

| | C | Si | Mn | Cr | Al | N | Nb | Ti | V | Mo | heating condition | AGS before finish rolling (um) | finish rolling temperature (° C.) | average deformation amount of finish rolling. | initial cooling rate (° C./s) | final cooling rate (° C./s) |
|---|---|---|---|---|---|---|---|---|---|---|---|---|---|---|---|---|
| Comparative Example 1 | 0.25 | 0.30 | 1.30 | 0.3 | 0.042 | 0.015 | 0.015 | — | — | — | 1000° C./ 90 min | 25 | 850 | 1.0 | 10 | 4 |
| Comparative Example 2 | 0.35 | 1.20 | 1.30 | 0.2 | 0.010 | 0.004 | 0.015 | 0.02 | — | — | 1050° C./ 90 min | 14 | 760 | 0.8 | 10 | 5 |

TABLE 1-continued

| | C | Si | Mn | Cr | Al | N | Nb | Ti | V | Mo | heating condition | AGS before finish rolling (um) | finish rolling temperature (° C.) | average deformation amount of finish rolling. | initial cooling rate (° C./s) | final cooling rate (° C./s) |
|---|---|---|---|---|---|---|---|---|---|---|---|---|---|---|---|---|
| Comparative Example 3 | 0.40 | 0.80 | 1.20 | 0.2 | 0.042 | 0.013 | 0.020 | 0.02 | — | 0.2 | 1020° C./ 95 min | 9 | 780 | 0.4 | 10 | 5 |
| Comparative Example 4 | 0.72 | 0.30 | 0.80 | 0.50 | 0.035 | 0.010 | — | — | — | — | 1000° C./ 90 min | 10 | 750 | 1.0 | 10 | 10 |
| Inventive Example 1 | 0.35 | 0.20 | 0.70 | 1.0 | 0.035 | 0.010 | — | — | — | — | 1000° C./ 90 min | 10 | 760 | 1.2 | 10 | 3 |
| Inventive Example 2 | 0.20 | 0.25 | 0.80 | 0.4 | 0.030 | 0.015 | 0.015 | — | 0.3 | 0.2 | 1000° C./ 90 min | 8 | 750 | 0.8 | 12 | 3 |
| Inventive Example 3 | 0.25 | 0.30 | 1.20 | 0.7 | 0.040 | 0.020 | 0.015 | — | — | — | 1000° C./ 90 min | 9 | 730 | 0.6 | 12 | 5 |
| Inventive Example 4 | 0.45 | 0.18 | 1.20 | 0.2 | 0.036 | 0.016 | — | 0.03 | — | 0.3 | 1000° C./ 90 min | 9 | 760 | 0.8 | 11 | 2 |
| Inventive Example 5 | 0.50 | 0.15 | 1.50 | 0.3 | 0.032 | 0.012 | — | 0.02 | 0.3 | 0.2 | 1000° C./ 90 min | 10 | 750 | 1.0 | 10 | 1 |

FIG. 1 (a) is a photograph showing the microstructure of Comparative Example 1 before the start of finish rolling, FIG. 1 (b) is a photograph showing the microstructure of Inventive Example 2, which is an embodiment of the present disclosure before the start of finish rolling.

In the case of FIG. 1 (b) according to Inventive Example 2, which is an embodiment of the present disclosure, it can be confirmed that the austenite grain size is smaller than that of FIG. 1 (a), which is Comparative Example 1. The small austenite grains before rolling can induce many deformations at grain boundaries during rolling to maximize ferrite nucleation sites during rolling and cooling. This maximizes the fraction of proeutectoid ferrite and allows heat treatment to be omitted by softening the material. In addition, it has an advantage of contributing to the refinement of grains and increasing the diffusion rate after completion of rolling.

FIG. 2 (a) is a photograph showing the microstructure of Comparative Example 1 in the early stage of cooling immediately after finishing rolling, and FIG. 2 (b) is a photograph showing the microstructure of Inventive Example 2, which is an embodiment of the present disclosure in the initial stage of cooling immediately after finishing rolling.

In the case of FIG. 2 (b) according to Inventive Example 2, which is an embodiment of the present disclosure, it can be confirmed that the ferrite grain size is smaller than that of FIG. 2 (a) according to Comparative Example 1. Accordingly, a high-speed diffusion is possible. According to one embodiment of the present disclosure, the rapid cooling during rolling can suppress the growth of proeutectoid ferrite, thereby refining the pearlite grain size and minimizing the thickness of the plate-like cementite in the pearlite.

FIG. 3 (a) is a photograph showing the microstructure of the wire rod of Comparative Example 3 obtained through slow cooling, FIG. 3 (b) is a microstructure of the Inventive Example 4 wire rod that is an embodiment of the present disclosure obtained through slow cooling.

In the case of FIG. 3 (b) according to Inventive Example 4, which is an embodiment of the present disclosure, it can be confirmed that, unlike FIG. 3 (a) according to Comparative Example 3, segmented cementite, not plate-like cementite, was generated. In addition, it can be seen that the ferrite microstructure also grew into a coarse grain favorable for cold heading.

[Table 2] below describes the ferrite grain size, pearlite colony size, wire rod cementite long and short axis ratio, wire rod segmented cementite fraction of the wire rod manufactured under the conditions of [Table 1] and the manufacturing conditions of [Table 1]. In addition, [Table 2] is a table describing the heating rate, the holding time, the cooling rate and the cementite ratio of 5:1 or less of the processed product to manufacture such a wire rod as a processed product.

TABLE 2

| | wire rod ferrite grain size (um) | wire rod pearlite colony size (um) | wire rod cementite long and short axis ratio | wire rod segmented cementite fraction (%) | heating rate (° C./hr) | holding time (hr) | cooling rate (° C./hr) | cementite ratio of 5:1 or less after heat treatment (%) |
|---|---|---|---|---|---|---|---|---|
| Comparative Example 1 | 10 | 10 | 300:1 | 10 | 200 | 4 | 25 | 70 |
| Comparative Example 2 | 12 | 13 | 300:1 | 8 | 300 | 4 | 25 | 75 |
| Comparative Example 3 | 15 | 12 | 250:1 | 3 | 250 | 8 | 30 | 70 |
| Comparative Example 4 | 8 | 7 | 100:1 | 10 | 200 | 7 | 30 | 70 |
| Inventive Example 1 | 3 | 3 | 100:1 | 15 | 70 | 6 | 15 | 85 |
| Inventive Example 2 | 4 | 3 | 70:1 | 20 | 80 | 7 | 18 | 90 |
| Inventive Example 3 | 3.5 | 3.2 | 60:1 | 17 | 70 | 6 | 10 | 85 |

TABLE 2-continued

| | wire rod ferrite grain size (um) | wire rod pearlite colony size (um) | wire rod cementite long and short axis ratio | wire rod segmented cementite fraction (%) | heating rate (° C./hr) | holding time (hr) | cooling rate (° C./hr) | cementite ratio of 5:1 or less after heat treatment (%) |
|---|---|---|---|---|---|---|---|---|
| Inventive Example 4 | 2.8 | 3.2 | 80:1 | 30 | 60 | 7 | 16 | 90 |
| Inventive Example 5 | 4.5 | 4.2 | 75:1 | 35 | 90 | 8 | 15 | 90 |

FIG. 4 (a) is a photograph showing the microstructure of Comparative Example 3 after spheroidizing heat treatment, and FIG. 4 (b) is a photograph showing the microstructure of Inventive Example 4, which is an embodiment of present disclosure after spheroidizing heat treatment.

In the case of FIG. 4 (b) according to Inventive Example 4, which is an embodiment of the present disclosure, it can be seen that spheroidization is more advanced than in FIG. 4 (a) according to Comparative Example 3. In the case of FIG. 4 (a), the spheroidization proceeded about 70%, and in the case of FIG. 4 (b), the spheroidization proceeded about 90%.

While the present disclosure has been particularly described with reference to exemplary embodiments, it should be understood by those of skilled in the art that various changes in form and details may be made without departing from the spirit and scope of the present disclosure.

Industrial Availability

The wire rod for cold heading according to the present invention is excellent in strength and ductility and can be used as a high-strength bolt used for fastening.

The invention claimed is:

1. A wire rod for cold heading comprising, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%, and the remainder of iron (Fe) and other inevitable impurities, wherein the wire rod comprises a pearlite colony as microstructure, wherein the long and short axis ratio of cementite present in the pearlite colony is 200: 1 or less, wherein the wire rod comprises a ferrite as a microstructure, and the maximum size of the ferrite grain size is 5 μm or less.

2. The wire rod of claim 1, wherein an area fraction of segmented cementite in the pearlite is 5 to 50%.

3. The wire rod of claim 1, wherein a maximum size of the pearlite colony is 5μm or less.

4. The wire rod of claim 1, wherein the wire rod comprises at least one precipitate of Al-based carbonitride, Nb-based carbonitride, V-based carbonitride, Mo-based carbonitride, and Ti-based carbonitride.

5. A manufacturing method of a wire rod for cold heading, the manufacturing method comprising:

heating a steel piece comprising, in percent (%) by weight of the entire composition, C: 0.15 to 0.5%, Si: 0.1 to 0.4%, Mn: 0.3 to 1.5%, Cr: 0.1 to 1.5%, Al: 0.02 to 0.05%, N: 0.004 to 0.02%, at least one selected from the group consisting of Nb: 0.001 to 0.03%, V: 0.01 to 0.3%, Mo: 0.01 to 0.5%, Ti: 0.001 to 0.03%, and the remainder of iron (Fe) and other inevitable impurities;

hot rolling the heated steel piece by finish rolling the heated steel piece at 700 to 780° C.;

cooling to 600° C. at 5 to 20° C./s after the hot rolling, and cooling to 400° C. at 5° C./s or less; thereby producing the wire rod of claim 1.

6. The manufacturing method of claim 5, wherein, in the hot rolling, the austenite grain size immediately before the finish rolling is 10 μm or less.

7. The manufacturing method of claim 5, wherein, in the hot rolling, the amount of deformation during finish rolling is 0.4 or more.

8. The manufacturing method of claim 5, wherein the heating the steel piece proceeds by maintaining within 90 minute at 900 to 1050° C.

* * * * *